(12) United States Patent
Underwood et al.

(10) Patent No.: US 7,790,022 B2
(45) Date of Patent: Sep. 7, 2010

(54) WATER FILTER AND TREATMENT SYSTEM AND COMPONENT

(75) Inventors: Lee Underwood, High Wycombe (GB); Mark Graeme Wilson, Marlow (GB); Jonathan Charles Fleisig, High Wycombe (GB); Steven John Bryant, High Wycombe (GB)

(73) Assignee: OTV SA, Cedex (FR)

( * ) Notice: Subject to any disclaimer, the term of this patent is extended or adjusted under 35 U.S.C. 154(b) by 0 days.

(21) Appl. No.: 12/156,883

(22) Filed: Jun. 5, 2008

(65) Prior Publication Data

US 2008/0272033 A1 Nov. 6, 2008

Related U.S. Application Data

(63) Continuation of application No. 10/506,712, filed on Sep. 7, 2004, now abandoned.

(51) Int. Cl.
*B01D 17/12* (2006.01)

(52) U.S. Cl. .................. 210/91; 96/223; 96/423; 210/143; 210/198.1; 210/232; 235/375; 365/51; 700/273

(58) Field of Classification Search .................. 210/85, 210/91, 94, 97, 106, 108, 143, 192, 198.1, 210/199–203, 241, 252–262, 332–335, 407–411, 210/232; 96/417–425, 223; 235/375, 435; 365/51; 700/273
See application file for complete search history.

(56) References Cited

U.S. PATENT DOCUMENTS

| | | | |
|---|---|---|---|
| 3,372,808 A | * | 3/1968 | Sabo ............................ 210/95 |
| 4,720,800 A | | 1/1988 | Suzuki et al. |
| 4,881,176 A | * | 11/1989 | Kononov ..................... 700/271 |
| 4,969,991 A | * | 11/1990 | Valadez ..................... 210/96.2 |
| 5,152,252 A | | 10/1992 | Bolton et al. |
| 5,179,281 A | | 1/1993 | Tawil et al. |
| 5,192,424 A | | 3/1993 | Beyne et al. |
| 5,276,432 A | | 1/1994 | Travis |
| 5,294,916 A | | 3/1994 | Bolton et al. |
| 5,296,655 A | | 3/1994 | Sargent et al. |
| 5,328,597 A | | 7/1994 | Boldt, Jr. et al. |
| 5,354,979 A | | 10/1994 | Adelson et al. |

(Continued)

FOREIGN PATENT DOCUMENTS

DE    40 28 529    3/1992

(Continued)

*Primary Examiner*—Joseph W Drodge
(74) *Attorney, Agent, or Firm*—Drinker Biddle & Reath LLP

(57) ABSTRACT

A water treatment system comprising a separable water treatment component and a host water treatment apparatus is described. The component is useable in the host apparatus, and has an electronic circuit which is adapted to co-operate with an electronic circuit in the host apparatus. In typical operation, the electronic circuit of the component includes at least a data tag, and the presence of the data tag is identified by the electronic circuit of the host apparatus upon correct fitment and/or installation of the component, which creates a two-way communication protocol. The host apparatus can then upload relevant data from the data tag, etc., and the component's circuit can download the relevant information from the host apparatus. The present invention provides the benefits of electrical co-operation and data tagging.

22 Claims, 1 Drawing Sheet

U.S. PATENT DOCUMENTS

| | | | |
|---|---|---|---|
| 5,468,968 A | | 11/1995 | Bailey et al. |
| 5,536,395 A | | 7/1996 | Kuennen et al. |
| 5,547,584 A | * | 8/1996 | Capehart .................... 210/669 |
| 5,606,516 A | | 2/1997 | Douglas et al. |
| 5,674,381 A | * | 10/1997 | Den Dekker ................ 210/85 |
| 5,741,416 A | * | 4/1998 | Tempest, Jr. ................ 210/90 |
| 5,853,572 A | | 12/1998 | Kidd et al. |
| 5,895,565 A | * | 4/1999 | Steininger et al. ............ 210/85 |
| 5,972,216 A | * | 10/1999 | Acernese et al. ............ 210/253 |
| 6,040,777 A | | 3/2000 | Ammann et al. |
| 6,051,144 A | * | 4/2000 | Clack et al. ................ 210/739 |
| 6,080,313 A | | 6/2000 | Kelada |
| 6,214,239 B1 | | 4/2001 | Renau |
| 6,379,539 B1 | * | 4/2002 | Ubelhor .................... 210/104 |
| 6,379,560 B1 | | 4/2002 | Tilp et al. |
| 6,380,637 B1 | * | 4/2002 | Hsu et al. ................ 290/1 R |
| 6,393,775 B1 | * | 5/2002 | Staschik .................... 52/79.1 |
| 6,471,853 B1 | | 10/2002 | Moscaritolo |
| 6,537,444 B2 | | 3/2003 | Wilberscheid et al. |
| 6,551,503 B2 | * | 4/2003 | Niers et al. .................... 210/85 |
| 6,558,444 B1 | * | 5/2003 | Hunter .................... 55/385.1 |
| 6,585,885 B2 | | 7/2003 | Larkner et al. |
| 6,607,668 B2 | | 8/2003 | Rela |
| 6,916,424 B2 | * | 7/2005 | Collins et al. ............... 210/646 |
| 6,988,204 B2 | * | 1/2006 | Alve et al. .................. 713/193 |
| RE39,361 E | * | 10/2006 | Den Dekker ................ 210/85 |
| 2003/0168389 A1 | * | 9/2003 | Astle et al. .................... 210/85 |
| 2006/0157391 A1 | * | 7/2006 | Astle et al. .................... 210/85 |

FOREIGN PATENT DOCUMENTS

| | | |
|---|---|---|
| DE | 196 27 595 | 1/1997 |
| DE | 201 04 481 | 6/2001 |

* cited by examiner

WATER FILTER AND TREATMENT SYSTEM AND COMPONENT

RELATED APPLICATION

The present application is a continuation of and claims priority to parent application Ser. No. 10/506,712, filed Sep. 7, 2004, now abandoned.

FIELD OF THE INVENTION

The present invention relates to a water filter and treatment component for use in host water treatment apparatus, and a system therefor.

BACKGROUND

In the production of treated and/or purified water, for example ultra-pure water for laboratory use, several components are generally used in conjunction to provide the desired water quality. Some of these components may be used in parallel or in series, and some are more critical than others to the final water quality. Nevertheless, the full and correct performance of all the components is generally essential to guarantee the treated water quality.

To ensure that the final water quality is of the required standard, quality monitors are usually installed either within or external to the water purification unit to monitor key water parameters on an ongoing basis. Typically these will include, but are not limited to, resistivity, conductivity, temperature, Total Organic Carbon (TOC), flow rate, etc.

Notwithstanding the above monitoring, for certain applications, industry regulations require traceability of components that affect the final water quality. Typically, this information is required by companies producing pharmaceuticals or similar products. Currently, this is generally carried out by manual logging of component information.

Meanwhile, components can often be installed and/or used in more than one position in a water treatment apparatus. In other situations, optimum performance of the apparatus can be obtained by using the components in different positions at different instances. However, incorrect performance and/or positioning cannot currently be prevented, which may seriously undermine the water quality and production.

Additionally, it is a desire to know how much capacity or operational lifetime is retained within a component. However, as most components are sealed units, this is impossible to forecast before the component suddenly expires or breaks down, again potentially significantly affecting the water production. This may cause inconvenience to the user who would often prefer to schedule component changes at specific times.

It is an intention of the present invention to obviate the above disadvantages.

SUMMARY OF THE INVENTION

Thus, according to one aspect of the present invention, there is provided a water treatment component for use in a host water treatment apparatus, wherein the component has an electronic circuit adapted to co-operate with an electronic circuit in the host apparatus. The host apparatus and separable water treatment component together comprise a water treatment system.

The co-operation may be one way, either from component to host or vice versa, or two-way.

The component circuit and host circuit can communicate via radio, infrared, or any other transmittable waveforms including optical and magnetic contact. Preferably, the circuits communicate by physical electrical contact for maximum robustness of connection, and to minimise interference by other means of communication. Preferably co-operation of the circuits is only possible when the communication is correctly created, and this is only achieved when the component is correctly installed and/or fitted with the host apparatus.

Each electronic circuit preferably includes a memory capacity and a capability to read/interrogate the other electrical circuit. The electrical circuit in the host apparatus preferably includes a central processor, and the electrical circuit in the component preferably includes or is a data chip, e.g. a microchip such as well known in the art. The electronic circuit of the component is preferably integral with the component, and more preferably, is formed integrally with the component during the component manufacture. The electronic circuit is preferably embedded into or mounted onto the component.

The electronic circuit of the component preferably includes a database having relevant data relating to that component such as validation information, process information, and/or manufacturing information. Typical information includes, but is not limited to, date of manufacture, date of testing, operator, cartridge type, media type(s), media volumes, media lot numbers, quality control details, and possibly a unique reference code.

The data of the component electronic circuit could be encrypted.

According to one embodiment of the present invention, the electronic circuit of the component provides an enablement signal to the electronic circuit of the host apparatus, and/or vice versa.

The enablement signal may include means for the component or host to control the other part. Preferably, the component and host inter-co-operate.

Information that can be communicated between the electronic circuits of the component and host generally include validation information, production information and/or manufacturing information. Such information in the component could be accessed from the component and be displayed by the host apparatus.

If necessary or desired, the same information in the system could be accessed via a separate reader device or otherwise communicated to a remote reader, for analysis and/or display.

In typical operation, the electronic circuit of the component includes at least a data tag, and the presence of the data tag is identified by the electronic circuit of the host apparatus upon correct fitment and/or installation of the component, which creates a two-way communication protocol. The host apparatus can then upload relevant data from the data tag, etc. and the component's circuit can download the relevant information from the host apparatus.

In another embodiment of the present invention, lack of co-operation between the electronic circuit of the component and electronic circuit of the host apparatus indicates the incorrect fitment and/or installation of the component with the host apparatus, or incorrect location of a component on a host apparatus where more than one location is possible.

In another embodiment of the present invention, the lack of co-operation between the electronic circuit of the component and the electronic circuit of the host apparatus identifies incorrect operation of the component and/or host apparatus, e.g. a water leak.

The present invention extends to a water treatment component as hereinbefore defined useable with a host water treatment apparatus having a co-operable electronic circuit, as well as a host water treatment apparatus useable with a water treatment component as hereinbefore defined, as well as their co-operation to provide a water treatment system. The electronic circuits of the component and host apparatus can co-operate in a manner as hereinbefore described.

In a further embodiment of the present invention the water treatment component of the present invention is a consumable and/or replacement unit such as a cartridge. This includes water treatment units containing ion exchange resins, filters, media, etc.

According to a yet further embodiment of the present invention, a similar treatment component useable with the host apparatus of the present invention is an operational unit. Such operational units include means to sanitise and/or clean e.g. by way of disinfection and/or chemical cleaning, one or more parts of the host apparatus. This may be by means of a component that contains the sanitant or by the fitment of dummy components in place of components that may be damaged by the sanitant.

The present invention provides the benefits of electrical co-operation and data tagging. These include one or more of correct installation/fitting/use of components, correct location of relevant components in a host apparatus, error-free transfer of information of component origins and/or history, automatic start and/or use of components such as sanitisation units, and prevention of incorrect components, such as half-used components, and out of date or inappropriate components.

BRIEF DESCRIPTION OF THE DRAWINGS

An embodiment of the present invention will now be described by way of example only, and with reference to the accompanying and diagrammatic FIG. 1 showing a water treatment component and host water treatment apparatus according to one embodiment of the present invention.

DETAILED DISCUSSION OF THE DRAWINGS

Figure 1:
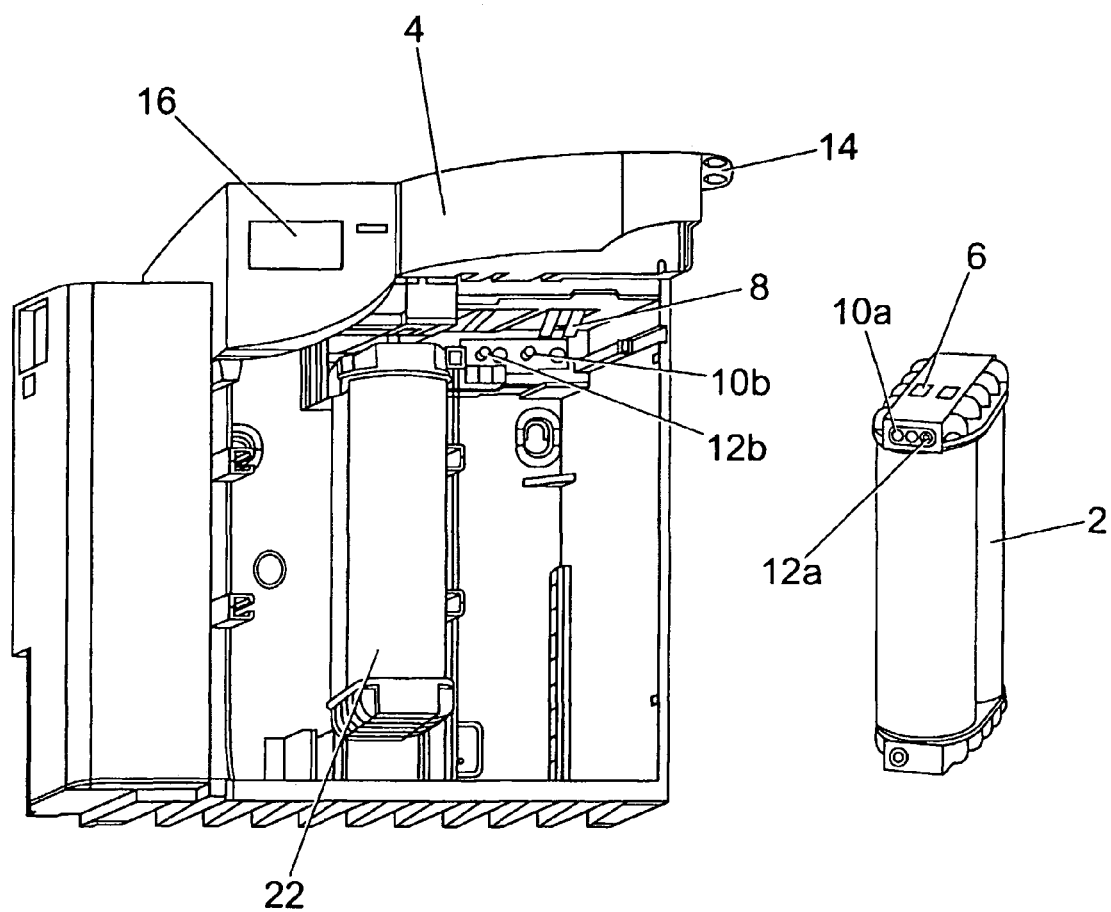

Referring to FIG. 1, there is shown a first water treatment component 2 and a host water treatment apparatus 4. The host apparatus 4 has two component locations, one shown ready to receive the first component 2, and one shown fitted with a second component 22.

The component 2 has an embedded microchip 6, which can co-operate with an electronic interface 8 on the host apparatus 4. The remaining part of the electronic circuitry in the host apparatus 4 is not shown.

The component 2 includes inlet and outlet water ports 10a, 12a, to fit with complementary inlet and outlet water ports 10b, 12b on the host apparatus.

The host apparatus includes a purified water outlet 14, and an electronic display 16.

The host apparatus 4 is a water purification unit, and the component 2 is a consumable resin cartridge.

The microchip 6 includes a database retaining product master records including date of manufacture of the component 2, date of testing, operator, cartridge type, media type (within the component), media volume, media lot numbers, quality control details, and a unique reference code. Only the correct installation and fitting of the component 2 within the opening in the host apparatus 4, allows the microchip 6 to engage and co-operate with the interface 8 on the host unit 4.

Once the component 2 is fitted correctly, the electronic circuitry in the host apparatus identifies the presence of a data tag on the component 2, such that a two-way communication protocol is established. Once communication has been made, the host apparatus 4 can upload relevant data from the microchip data tag 6, and the micro chip data tag 6 can download relevant information from the host apparatus 4. The information uploaded to the host apparatus includes performance validation criteria such as lot numbers, dates and content type and property. Information which is downloaded into the microchip data tag 6 includes date of commencement of operation and volume of water used on an ongoing basis. The combination of this information allows improvement in determination of consumable lifetime.

Some or all of this information could be displayed on the display 16 on the host apparatus 4. This could include visual warning of any incorrect operation, or end of life-time of the component 2.

Because the host apparatus electronic circuitry can identify the presence, or not, of a data tag, it can be used to prevent leaks from the apparatus 4, in that if a component is not fitted correctly with its data tag in place, then the apparatus 4 will not operate and thus prevent leaks occurring.

Moreover, if the component 2 could be fitted in more than one opening in the host apparatus 4, incorrect fitment of the component 2 in the wrong position could be prevented due to the unique identifier code on each data tag. In this regard, FIG. 1 shows a second separable water treatment component 22. This may provide the same function as the first component 2, or different. If different, an attempt to fit the first component 2 into the location of the second component 22 may provide an error signal or sign through the display 16, thus ensuring that the host apparatus 4 is not compromised.

The memory in the host apparatus electronic circuitry could also detect if a particular data tag has been previously used in a particular position, and hence also prevent a situation where optimum performance is not obtained. Furthermore, if certain changes to the configuration of components is required prior to carrying out such functions as sanitisation then this configuration can be ascertained prior to entering that mode.

The present provides a number of clear advantages, including increased automation of information logging, prevention of use of components in an un-optimised manner, greater user awareness of remaining operational life time of components, and prevention of mis-connection/mis-installation which could compromise final water quality, etc.

The invention claimed is:

1. An ultra-pure water treatment system comprising:
a host ultra-pure water treatment apparatus including an electronic circuit, and a separable water treatment component, said component being useable in the host apparatus, wherein the water treatment component has an electronic circuit adapted to co-operate with the electronic circuit in the host apparatus for communicating and/or transmitting data between the separable treatment component and the water treatment apparatus when the separable water treatment component is mounted to the apparatus; and
means for sanitizing one or more parts of the host apparatus by channeling a sanitizing agent from the means for sanitizing and into the host apparatus, the means for sanitizing being a separate sanitizing component that is adapted to be incorporated into the apparatus in place of the separable water treatment component, the means for sanitizing being separable from the host apparatus for permitting sanitizing of the parts of the host apparatus when installed, the component that includes the means for sanitizing having an electronic circuit that communicates with the electronic circuit in the host apparatus;

wherein the electrical circuit in the host apparatus includes a central processor, and the electrical circuit in the water treatment component includes a data chip; and wherein the electronic circuit on the host apparatus being operable upon recognizing the electronic circuit on the sanitizing component commences a sanitizing operation of other components on the host apparatus.

2. An ultra-pure water treatment system as claimed in claim 1, wherein the co-operation between the water treatment component and the host apparatus is either one-way or two-way.

3. An ultra-pure water treatment system as claimed in claim 1, wherein the component circuit and the host circuit communicate via one or more of the following transmittable waveforms: radio, infrared, optical and magnetic.

4. An ultra-pure water treatment system as claimed in claim 1, wherein the component circuit and the host circuit communicate by physical electrical contact.

5. An ultra-pure water treatment system as claimed in claim 1, wherein co-operation of the component circuit and the host circuit is only possible when the water treatment component is conjoined with the host apparatus.

6. An ultra-pure water treatment system as claimed in claim 1, wherein the component circuit and/or the host circuit includes a memory capacity.

7. An ultra-pure water treatment system as claimed in claim 1, wherein each electronic circuit can read and/or interrogate the other electrical circuit.

8. An ultra-pure water treatment system as claimed in claim 1, wherein the electronic circuit of the water treatment component provides an enablement signal to the electronic circuit of the host apparatus, and/or vice versa.

9. An ultra-pure water treatment system as claimed in claim 8, wherein the enablement signal includes means for the water treatment component or host apparatus to control the other part.

10. An ultra-pure water treatment system as claimed in claim 1, wherein the water treatment component and host inter-co-operate.

11. An ultra-pure water treatment system as claimed in claim 1, wherein the electronic circuit of the water treatment component includes at least a data tag.

12. An ultra-pure water treatment system as claimed in claim 11, wherein the presence of the data tag is identified by the electronic circuit of the host apparatus.

13. An ultra-pure water treatment system as claimed in claim 1, wherein the electronic circuit of the component is integral with the component.

14. An ultra-pure water treatment system as claimed in claim 13, wherein the electronic circuit is embedded into or mounted onto the component.

15. An ultra-pure water treatment system as claimed in claim 1, wherein the electronic circuit of the component includes a database having characterising data relating to the component.

16. An ultra-pure water treatment system as claimed in claim 1, wherein the data of the component electronic circuit is encrypted.

17. An ultra-pure water treatment system as claimed in claim 1, wherein the component is a consumable replaceable unit.

18. An ultra-pure water treatment system comprising:
a host ultra-pure water treatment apparatus including an electronic circuit, and a separable water treatment component, said component being useable in the host apparatus, wherein the water treatment component has an electronic circuit adapted to cooperate with the electronic circuit in the host apparatus for communicating and/or transmitting data between the separable treatment component and the water treatment apparatus when the separable water reatment component is mounted to the apparatus; and wherein the component includes a sanitizing agent for sanitizing one or more parts of the host apparatus, the component adapted to channel a sanitizing agent from the component into the host apparatus so that the sanitizing agent can circulate through at least part of the host apparatus wherein the electrical circuit in the host apparatus includes a central processor, and the electrical circuit in the water treatment component includes a data chip; and wherein the electronic circuit on the host apparatus being operable upon recognizing the electronic circuit on the sanitizing component commences a sanitizing operation of other components on the host apparatus.

19. An ultra-pure water treatment system as claimed in claim 1, wherein the electronic circuit on the component is a data chip that includes stored data related to the separable component.

20. An ultra-pure water treatment system as claimed in claim 1, wherein the electronic circuit on the host apparatus interrogates the electronic circuit on the separable component to determine the status of the separable component.

21. An ultra-pure water treatment system, comprising:
a host ultra-pure water treatment apparatus including an electronic circuit, and a separable water treatment component, said component being useable in the host apparatus, wherein the water treatment component has an electronic circuit adapted to co-operate with the electronic circuit in the host apparatus for communicating and/or transmitting data between the separable treatment component and the water treatment apparatus when the separable water treatment component is mounted to the apparatus; and
means for sanitizing one or more parts of the host apparatus by channeling a sanitizing agent from the means for sanitizing and into the host apparatus, the means for sanitizing being a separate sanitizing component that is adapted to be incorporated into the apparatus in place of the separable water treatment component, the means for sanitizing being separable from the host apparatus for permitting sanitizing of the parts of the host apparatus when installed, the component that includes the means for sanitizing having an electronic circuit that communicates with the electronic circuit in the host apparatus;
wherein the electrical circuit in the host apparatus includes a central processor, and the electrical circuit in the water treatment component includes a data chip; and wherein the host apparatus includes multiple components, wherein the means for sanitizing is incorporated into the separable component, and
wherein upon engagement of the separable component with the host apparatus and the electronic circuit on the host apparatus being operable upon recognizing the electronic circuit on the sanitizing component, a sanitizing agent from the means for sanitizing is channeled into the host apparatus and circulated to at least one other component for sanitizing the component.

22. An ultra-pure water treatment system for producing ultra-pure water for laboratory use, the system comprising:
a host ultra-pure water treatment apparatus including an electronic circuit, a separable water treatment component, the component being useable in the host apparatus, the water treatment component includes an electronic circuit adapted to co-operate with the electronic circuit in the host apparatus for communicating and/or transmitting data between the separable treatment component and the water treatment apparatus when the separable water treatment component is mounted to the apparatus; and a sanitizing component adapted to sanitize one or more parts of the host apparatus by channeling a sanitizing agent from the component into the host apparatus, the sanitizing component being a separate component that is adapted to be attached to the water treatment apparatus in place of the separable water treatment component, the sanitizing component for permitting sanitizing of the parts of the host apparatus when installed, the sanitizing component including an electronic circuit that communicates with the electronic circuit in the host apparatus; and wherein the electronic circuit on the host apparatus being operable upon recognizing the electronic circuit on the sanitizing component commences a sanitizing operation of other components on the host apparatus.

* * * * *